United States Patent
Wakizaka et al.

(10) Patent No.: US 8,426,062 B2
(45) Date of Patent: Apr. 23, 2013

(54) BINDER COMPOSITION FOR NONAQUEOUS ELECTROLYTE SECONDARY BATTERY ELECTRODE AND NONAQUEOUS ELECTROLYTE SECONDARY BATTERY

(75) Inventors: Yasuhiro Wakizaka, Yokohama (JP); Kei Kobayashi, Tokyo (JP)

(73) Assignee: Zeon Corporation, Tokyo (JP)

( * ) Notice: Subject to any disclaimer, the term of this patent is extended or adjusted under 35 U.S.C. 154(b) by 300 days.

(21) Appl. No.: 12/919,894

(22) PCT Filed: Feb. 27, 2009

(86) PCT No.: PCT/JP2009/053685
§ 371 (c)(1),
(2), (4) Date: Aug. 27, 2010

(87) PCT Pub. No.: WO2009/107778
PCT Pub. Date: Sep. 3, 2009

(65) Prior Publication Data
US 2011/0003202 A1 Jan. 6, 2011

(30) Foreign Application Priority Data
Feb. 29, 2008 (JP) ................................. 2008-050120

(51) Int. Cl.
*H01M 4/02* (2006.01)
(52) U.S. Cl.
USPC ............ 429/209; 429/214; 429/217; 429/233
(58) Field of Classification Search .................. 429/209, 429/214, 217, 233; 252/182.1
See application file for complete search history.

(56) References Cited

U.S. PATENT DOCUMENTS
2007/0260005 A1 * 11/2007 Karato et al. ................. 524/458

FOREIGN PATENT DOCUMENTS
| JP | 11-67211 A | 3/1999 |
| JP | 2003-308841 | * 10/2003 |
| JP | 2007-250380 A | 9/2007 |
| JP | 2008-7667 A | 1/2008 |
| WO | WO 2005/050762 A1 | 6/2005 |

OTHER PUBLICATIONS

International Search Report, PCT/JP2009/053685, mailed on May 12, 2009.

* cited by examiner

*Primary Examiner* — Laura Weiner
(74) *Attorney, Agent, or Firm* — Birch, Stewart, Kolasch & Birch, LLP

(57) ABSTRACT

Disclosed is a binder composition for a nonaqueous electrolyte secondary battery electrode including an antioxidizing agent, able to inhibit the thickening of an electrode slurry. The binder composition enables to form electrode slurry without making the antioxidizing agent adhere to the insides of fine pores of electrode active materials after coating and drying. The binder composition for a nonaqueous electrolyte secondary battery electrode contains a binder and an emulsified antioxidizing agent, and particularly, it is preferable that the binder is an aqueous binder including a diene-based polymer and that the antioxidizing agent is a polymeric phenol compound.

6 Claims, No Drawings

BINDER COMPOSITION FOR NONAQUEOUS ELECTROLYTE SECONDARY BATTERY ELECTRODE AND NONAQUEOUS ELECTROLYTE SECONDARY BATTERY

TECHNICAL FIELD

The disclosed is a binder composition used for a electrode of a nonaqueous electrolyte secondary battery such as lithium-ion secondary battery, an electrode slurry, a nonaqueous electrolyte secondary battery electrode and a nonaqueous electrolyte secondary battery.

DESCRIPTION OF THE RELATED ART

Recently, it is notable that portable terminals such as laptop computer, mobile phone and PDA become widely used. For secondary batteries used for power sources of these portable terminals, a nonaqueous electrolyte secondary battery (hereinafter may be simply referred to as "battery") such as a lithium-ion secondary battery is heavily used. The portable terminals are rapidly downsized, made thinner, reduced in weight and technically-advanced for more excellent portability. As a result, the portable terminals are used in various occasions. With their increased occasions to be used, it is also required that the batteries as power source are downsized, made thinner, reduced in weight and technically-advanced as well as the portable terminals.

For improving battery performance, it has been studied to improve an electrode, an electrolytic solution and other battery members. The electrode can normally be produced as follows. Namely, the electrode is produced by mixing a binding agent and fluid medium to obtain a binder composition by adding an arbitrary additive if necessary; adding this binder composition with an electrode active material to make an electrode slurry; and coating the obtained electrode slurry on a collector and drying to form an electrode active material layer.

Patent Article 1 (Japanese Unexamined Patent Publication No. H10-154531) discloses that an antioxidizing agent is included in positive and negative electrodes for solving safety problems such as overcharge, heating and short circuit of a lithium-ion secondary battery. In Patent Article 1, a mixture of a binder such as polyvinylidene fluoride, a conductive agent such as acetylene black and an electrode active material is added with a hindered amine-based antioxidizing agent, and added with an organic solvent such as N-methylpyrrolidone to obtain an electrode slurry.

Also, Patent Article 2 (Japanese Unexamined Patent Publication No. H11-73964) discloses that an antioxidizing agent is included in a negative electrode for improving battery properties, particularly cycle characteristic. In Patent Article 2, a binder composition obtained by dissolving a binder such as polyvinylidene fluoride and an antioxidizing agent such as 3,5-di-t-butyl-hydroxytoluene in an organic solvent such as N-methylpyrrolidone is added with an electrode active material to obtain an electrode slurry.

In addition, Patent Article 3 (Japanese Unexamined Patent Publication No. 2006-209995) discloses that an antioxidizing agent is included in a positive electrode for inhibiting oxidation decomposition near the positive electrode under high voltage. In Patent Article 3, a mixture of a binder such as polyvinylidene fluoride, a conductive agent such as acetylene black, a positive electrode active material such as lithium cobaltate is added with a phenolic or hindered amine-based antioxidizing agent, and added with an organic solvent such as N-methylpyrrolidone to obtain an electrode slurry.

Furthermore, Patent Article 4 discloses a binder composition for a lithium-ion secondary battery electrode comprising an N-methylpyrrolidone solution of a copolymer obtained by anion living polymerization between aromatic vinyl monomers and conjugated diene monomers, and discloses that an antioxidizing agent may be added if desired when obtaining said copolymer.

[Patent Article 1] Japanese Unexamined Patent Publication No. H10-154531
[Patent Article 2] Japanese Unexamined Patent Publication No. H11-73964
[Patent Article 3] Japanese Unexamined Patent Publication No. 2006-209995
[Patent Article 4] Japanese Unexamined Patent Publication No. 2000-285924

DISCLOSURE OF INVENTION

Problem to be Solved by the Invention

However, when adding an electrode active material to a binder composition in which an antioxidizing agent is dissolved, the obtained electrode slurry may be thickened over time. The reason is not fully understood, and it can be believed that a particle with small particle diameter in the electrode active material and the dissolved antioxidizing agent may interact with each other to cause aggregation of particles, etc. As a result, the fine particle and molecules of the antioxidizing agent may show structural viscosity to cause thickening of the slurry over time.

If the slurry is thickened during the steps of producing and coating, a coating thickness may be varied when the slurry is coated onto a collector. As a result, a balance in properties between a positive and negative electrode is broken, and the lifetime and quality of the battery differ from one product to another, so that it is hard to obtain a battery with constant quality.

Also, when adding the electrode active material to the binder composition in which the antioxidizing agent is dissolved, molecules of the antioxidizing agent may enter fine pores of the electrode active material. Due to drying after coating the slurry, the antioxidizing agent adheres to the fine pores of the active material, and a lithium ion-accepting property is deteriorated. As a result, primary charge-discharge properties and rate property of the battery may be reduced.

The present invention was made in view of the above-described prior arts, and its purpose is to provide a binder composition including an antioxidizing agent, able to inhibit the thickening of an electrode slurry. Also, another purpose is to provide a binder composition, able to form an electrode slurry without making an antioxidizing agent adhere to the insides of fine pores of electrode active materials after coating and drying.

Means for Solving the Problem

For solving the above problems, the present inventors have found, as a result of keen examinations, that an interaction between an electrode active material and an antioxidizing agent can be inhibited by emulsifying the antioxidizing agent to reduce the thickening of slurry. Also, the present inventors have found that the lithium ion-accepting property of the active material can be maintained because it is difficult for an emulsified antioxidizing agent to enter fine pores of the electrode active material, resulting in improvement of primary charge-discharge properties and rate property of a battery. The present invention was attained based on the findings.

Namely, the gist of the present invention for solving the above problems is summarized as follows.

(1) A binder composition for a nonaqueous electrolyte secondary battery electrode comprising a binder and an emulsified antioxidizing agent.

(2) The binder composition for a nonaqueous electrolyte secondary battery electrode as set forth in (1), wherein the binder is an aqueous binder including a diene-based polymer.

(3) The binder composition for a nonaqueous electrolyte secondary battery electrode as set forth in (1) or (2), wherein the antioxidizing agent is a polymeric phenolic compound.

(4) A slurry composition for a nonaqueous electrolyte secondary battery electrode comprising the binder composition for a nonaqueous electrolyte secondary battery electrode as set forth in (1) and an active material.

(5) A production method of a slurry composition for a nonaqueous electrolyte secondary battery electrode comprising:

preparing a binder composition for a nonaqueous electrolyte secondary battery electrode by mixing a binder and a emulsified antioxidizing agent; and mixing said binder composition with an active material.

(6) An electrode for a nonaqueous electrolyte secondary battery, wherein an electrode layer obtained by coating the slurry composition for a secondary battery electrode as set forth in (4) on a collector and drying is bound thereto.

(7) A nonaqueous electrolyte secondary battery comprising the electrode as set forth in (6).

Effects of the Invention

According to the present invention, an interaction between the electrode active material and antioxidizing agent can be inhibited and the thickening of the slurry can be reduced because the antioxidizing agent is used in an emulsified form. As a result, coating thickness can be maintained constant when the slurry is coated onto the collector, and quality of the obtained battery may be stabilized. Also, it is hard for the emulsified antioxidizing agent to enter the fine pores of the electrode active material, so that lithium ion-accepting property of the active material can be maintained, and initial charge-discharge properties and rate property of the battery can be improved.

BEST MODE FOR WORKING THE INVENTION

Hereinafter, the present invention will be explained in detail.

(Binder Composition for Nonaqueous Electrolyte Secondary Battery Electrode)

A binder composition for a nonaqueous electrolyte secondary battery electrode of the present embodiment comprises a binder and an emulsified antioxidizing agent.

(Binder)

The binder is a solution or fluid dispersion in which binder (polymer) particles having binding property are dissolved or dispersed in water or organic solvent (hereinafter may collectively be referred to as "binder dispersion"). When the binder dispersion is aqueous, the binder is normally a aqueous dispersion of polymer particle, and for example, there may be mentioned an aqueous dispersion of diene-based polymer particle, an aqueous dispersion of acrylic-type polymer particle, an aqueous dispersion of fluorinated polymer particle, an aqueous dispersion of silicon-based polymer particle, etc. Because of excellent binding property to the electrode active material and excellent strength and bendability of the obtained electrode, the aqueous dispersion of diene-based polymer particle or aqueous dispersion of acrylic-type polymer particle is preferred.

Also, when the binder dispersion is nonaqueous (where an organic solvent is used as a dispersion medium), the binder may normally include those obtained by dissolving the following polymer in N-methylpyrrolidone (NMP): vinyl polymers such as polyethylene, polypropylene, polyisobutylene, polyvinyl chloride, polyvinylidene chloride, polyvinylidene fluoride, polytetrafluoroethylene, polyvinyl acetate, polyvinyl alcohol, polyvinyl isobutyl ether, polyacrylonitrile, polymethacrylonitrile, polymethylmethacrylate, polymethylacrylate, polymethylmethacrylate, allyl acetate and polystyrene; diene-based polymers such as polybutadiene and polyisoprene; ether-type polymers having a heteroatom in its main chain such as polyoxymethylene, polyoxyethylene, polycyclic thioether and polydimethylsiloxane; condensed ester-based polymer such as polylactone polycyclic anhydride, polyethylene terephthalate and polycarbonate; condensed amide-based polymer such as nylon 6, nylon 66, poly-m-phenylene isophthalamide, poly-p-phenylene terephthalamide and polypyromellitic imide.

The aqueous dispersion of diene-based polymer particle indicates an aqueous dispersion of polymer particles containing a monomer unit obtained by polymerizing a conjugated diene such as butadiene and isoprene. A ratio of the monomer unit obtained by polymerizing a conjugated diene in the diene-based polymer is normally 40 wt % or more, preferably 50 wt % or more and more preferably 60 wt % or more. The polymer may include a homopolymer of conjugated diene such as polybutadiene and polyisoprene; and a copolymer of conjugated diene and its copolymerizable monomer. As said copolymerizable monomer, there may be mentioned α,β-unsaturated nitrile compounds such as acrylonitrile and methacrylonitrile; unsaturated carboxylic acids such as acrylic acid and methacrylic acid; styrene-based monomer such as styrene, chlorostyrene, vinyl toluene, t-butylstyrene, vinyl benzoic acid, vinyl methyl benzoate, vinylnaphthalene, chloromethyl styrene, hydroxymethylstyrene, α-methylstyrene and divinylbenzene; olefins such as ethylene and propylene; diene-based monomers such as butadiene and isoprene; halogen atom containing monomers such as vinyl chloride and vinylidene chloride; vinylesters such as vinyl acetate, vinyl propionate, vinyl butyrate and vinyl benzoate; vinyl ethers such as methyl vinyl ether, ethyl vinyl ether and butyl vinyl ether; vinyl ketones such as methyl vinyl ketone, ethyl vinyl ketone, butyl vinyl ketone, hexyl vinyl ketone and isopropenyl vinyl ketone; heterocyclic ring containing vinyl compounds such as N-vinyl pyrrolidone, vinylpyridine and vinylimidazole.

The aqueous dispersion of acrylic-type polymer particle indicates an aqueous dispersion of polymer containing a monomer unit obtained by polymerizing ester of acrylic acid and/or ester of methacrylic acid. A ratio of the monomer unit obtained by polymerizing ester of acrylic acid and/or ester of methacrylic acid is normally 40 wt % or more, preferably 50 wt % or more and more preferably 60 wt % or more. The polymer may include a homopolymer of ester of acrylic acid and/or ester of methacrylic acid and a copolymer of this and its copolymerizable monomer. As said copolymerizable monomer, there may be mentioned unsaturated carboxylic acids such as acrylic acid, methacrylic acid, itaconic acid and fumaric acid; carboxylic acid esters having 2 or more carbon-carbon double bonds such as ethylene glycol dimethacrylate, diethylene glycol dimethacrylate and trimethylolpropane triacrylate; styrene-based monomers such as styrene, chlorostyrene, vinyl toluene, t-butyl styrene, vinyl benzoic acid, vinyl methyl benzoate, vinylnaphthalene, chloromethyl styrene, hydroxymethylstyrene, α-methylstyrene and divinylbenzene; amide-based monomers such as acrylamide, N-methylol acrylamide and acrylamide-2-methylpropanesulfonic acid; α,β-unsaturated nitrile compounds such as acrylonitrile and methacrylonitrile; olefins such as ethylene and propylene; diene-based monomers such as butadiene and isoprene; halogen atom containing monomers such as vinyl chloride and vinylidene chloride; vinylesters such as vinyl acetate, vinyl propionate, vinyl butyrate and vinyl benzoate; vinyl ethers such as methyl vinyl ether, ethyl vinyl ether and butyl vinyl ether; vinyl ketones such as methyl vinyl ketone, ethyl vinyl ketone, butyl vinyl ketone, hexyl vinyl ketone and isopropenyl vinyl ketone; heterocyclic ring containing vinyl compounds such as N-vinyl pyrrolidone, vinylpyridine and vinylimidazole.

A binder for a positive electrode may preferably be the aqueous dispersion of acrylic-type polymer particle, i.e. a dispersion of saturated polymers having no unsaturated bond in its polymer main chain because of excellent oxidation resistance when charging.

Also, a binder for a negative electrode may preferably be the aqueous dispersion of diene-based polymer particle because of excellent reduction resistance and strong binding force.

The binder dispersion may be an aqueous binder having water as its dispersion medium or a nonaqueous binder having organic solvent as its dispersion medium, and the aqueous binder can preferably be used in view of miscibility with after-mentioned emulsified antioxidizing agent.

The aqueous binder can be, for example, produced by emulsifying and polymerizing the above monomer in water. Also, the nonaqueous binder can be produced by substituting the dispersion medium of said aqueous binder with organic solvent. Average particle diameter of the binder particles in the binder dispersion is preferably 50 nm to 500 nm, further preferably 70 nm to 400 nm. When the average particle diameter is within this range, strength and flexibility of the obtained electrode may be favorable.

Glass-transition temperature (T g) of the polymer in the binder dispersion can properly be selected depending on intended use, and is normally in a range of −150° C. to +100° C., preferably −50° C. to +25° C. and further preferably −35° C. to +5° C. When the T g of the polymer is within the range, properties of the electrode, such as flexibility, binding property and winding property, and adhesiveness between an active material layer and a collector layer, are excellently balanced.

Solid content concentration of the binder dispersion is normally 15 to 70 mass %, preferably 20 to 65 mass % and further preferably 30 to 60 mass %. When the solid content concentration is within the range, workability for producing the electrode slurry becomes favorable.

(Antioxidizing Agent)

For the antioxidizing agent, a slow reducing agent is preferable used in the present embodiments. The slow reducing agent means a radical capture agent, and may include, for example, phenol compounds such as 3,5-di-t-butyl-4-hydroxytoluene, dibutyl hydroxytoluene, 2,2'-methylenebis(6-t-butyl-4-methylphenol), 4,4'-butylidenebis(3-t-butyl-3-methylphenol), 4,4'-thiobis(6-t-butyl-3-methylphenol), α-tocophenol and 2,2,4-trimethyl-6-hydroxy-7-t-butylchromane;

hydroquinone compounds such as 2,5-di-t-butylhydroquinone, 2,5-di-t-octylhydroquinone, 2,6-di-n-dodecylhydroquinone, 2-n-dodecyl-5-chloro hydroquinone and 2-t-octyl-5-methylhydroquinone;

organic phosphorous compounds such as triphenylated phosphorous, tris(dinonylphenylated) phosphorus and tricresolated phosphorus;

sulfur compounds such as dilauryl-3,3'-thiodipropionate and distearyl-3,3'-thiodipropionate;

phenylenediamine compounds such as N-phenyl-N'-isopropyl-p-phenylenediamine; and polymeric phenol compounds. The polymeric phenol compound is a polymer having phenol structure within the molecule, and it may be preferred to use the polymeric phenol compound with weight average molecule weight of 200 to 1000, preferably 600 to 700.

The further specific example for such polymeric phenol compound may be as shown below:

[Chemical formula 1]

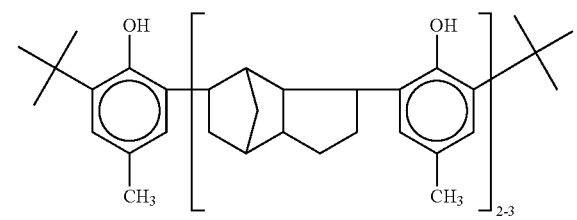

Given the effect on cycle characteristic and adverse effect on battery property, etc., among the above antioxidizing agents, the polymeric phenol compound, phenol compound, hydroquinone compound and organic phosphorous compound are preferable, the polymeric phenol compound and phenol compound are particularly preferable, and the polymeric phenolic compound as shown in the above formula is further preferable. Also, the antioxidizing agent may be used in a mixture of 2 or more.

In the binder composition for a nonaqueous electrolyte secondary battery electrode of the present embodiments, the above antioxidizing agent is emulsified when used. Method for emulsifying the antioxidizing agent is not particularly limited, and for example, there may be mentioned a method in which water and emulsifier are placed in a mixer such as a three-one motor, followed by gradually adding the antioxidizing agent to emulsify. Also, organic solvent such as alcohol solution may be used, if necessary, as an additive for stabilizing emulsion and controlling particle diameter. Also, when the antioxidizing agent is in a powdery state, this is first dissolved in a solvent soluble thereof and same procedure is performed. Average disperse particle diameter of the antioxidizing agent in the emulsion is preferably 0.05 to 5 μm, further preferably 0.1 to 2 μm. When the average disperse particle diameter is within the range, thickening of the obtained binder composition may be inhibited, and also, battery property can be improved.

In the binder composition for a nonaqueous electrolyte secondary battery electrode of the present embodiments, the antioxidizing agent is used in a ratio of preferably 0.05 to 20 parts by mass, further preferably 0.05 to 5 parts by mass and particularly preferably 0.25 to 2 parts by mass per 100 parts by mass of binder polymer (solid content) in said binder dispersion. By controlling the content ratio of the antioxidizing agent in the binder composition within said range, favorable slurry can be obtained without causing an interaction between the electrode active material and antioxidizing agent, so that coating thickness of the electrode is uniform to make the quality of the obtained battery constant. When the content ratio of the antioxidizing agent in the binder composition is less than said range, the antioxidizing agent may show little effect, and when it exceeds said range, in contrast, the antioxidizing agent may work as a plasticizer to result in reducing adhesion strength of the electrode.

When the average particle diameter and content of the antioxidizing agent in the emulsion are within the ranges, the thickening can be inhibited even if adding the active material to the obtained binder composition, and the battery property can also be improved.

(Production of Binder Composition for Nonaqueous Electrolyte Secondary Battery Electrode)

The binder composition for a nonaqueous electrolyte secondary battery electrode can be obtained by mixing the binder dispersion with the emulsified antioxidizing agent.

A method for mixing is not particularly limited, and for example, there may be mentioned a method with the use of a mixing apparatus such as an agitating-type, shaking-type and rotating-type. Also, there is a method with the use of a dispersion mixer such as a homogenizer, ball mill, sand mill, roll mill and planetary kneading machine.

(Slurry Composition for Nonaqueous Electrolyte Secondary Battery Electrode)

The slurry composition for a nonaqueous electrolyte secondary battery electrode includes the above binder composition for a secondary battery electrode and the electrode active material.

(Electrode Active Material)

The electrode active material used in the present embodiments may be any compound that can reversibly insert and release a lithium ion by applying an electrical potential in the electrolyte, and may be either inorganic compound or organic compound.

As an active material for the positive electrode, there may be illustrated lithium-containing composite metallic oxides such as $LiCoO_2$, $LiNiO_2$, $LiMnO_2$, $LiMn_2O_4$, $LiFeVO_4$ and $Li_xNi_yCO_zMn_wO_2$ (where x+y+z+w=2); salts of lithium-containing composite metallic oxo acids such as $LiFePO_4$, $LiMnPO_4$ and $LiCoPO_4$; transition metallic sulfides such as $TiS_2$, $TiS_3$ and amorphous $MoS_3$; transition metallic oxides such as $Cu_2V_2O_3$, amorphous $V_2O$—$P_2O_5$, $MoO_3$, $V_2O_5$ and $V_6O_{13}$; and compounds in which a part of transition metals in these compounds is substituted with other metals. Furthermore, highly-conductive molecules such as polyacetylene and poly-p-phenylene can be used. Also, these may be coated with carbon materials or inorganic compounds on its partial or entire surface when used.

Also, as an electrode active material for the negative electrode, for example, there may be mentioned carbon materials such as amorphous carbon, graphite, natural graphite, mesocarbon microbead (MCMB) and pitch-based carbon fiber, highly-conductive molecules such as polyacene, etc. Metals alloyable with lithium, such as Si, Sn, Sb, Al, Zn and W, and alloys thereof can also be mentioned. The electrode active material in which electrical conducting materials are adhered onto its surface by a mechanical reforming process is usable as well. Also, the above active materials may be mixed to use.

Among these, the lithium-containing composite metallic oxide and lithium-containing composite metallic oxo acid are preferable as the positive electrode active material and the carbon material is preferable as the negative electrode active material because of ease to obtain high capacity, stability at high temperature, small change in volume due to inserting and releasing of lithium ion and ease to decrease change rate of electrode thickness.

Particle shape of the negative electrode active material is not particularly limited. For example, scale-like shape, massive form, fibrous form and globular shape can be used. The negative electrode active material is preferably powder with an average particle diameter of 0.1 to 100 μm for uniformly dispersing in the coating layer. The negative electrode active material may be used alone or in a combination of 2 or more.

Total amount of the binder, antioxidizing agent and active material in the electrode slurry is preferably 10 to 90 parts by mass, further preferably 30 to 80 parts by mass, per 100 parts by mass of the slurry. Also, amount of the active material in the electrode slurry is preferably 5 to 80 parts by mass, further preferably 10 to 60 parts by mass, per 100 parts by mass of the slurry. When the total amount of respective components and the amount of the active material are within the ranges, the viscosity of the obtained slurry can properly be maintained, and the coating can be smooth.

Amount of the binder in the electrode slurry is, in solid content, normally 0.1 to 10 parts by mass, preferably 0.5 to 8 parts by mass and further preferably 0.7 to 1.2 parts by mass, per 100 parts by mass of the electrode active material. When the amount is within the range, the obtained electrode can show favorable strength and bendability.

Amount of the antioxidizing agent in the electrode slurry is normally preferably 0.0001 to 2 parts by mass, further preferably 0.0025 to 0.4 parts by mass, per 100 parts by mass of the electrode active material. When the amount is within the range, the obtained battery property can be favorable.

(Thickener)

The electrode slurry of the present invention may include a thickener. As the thickener, there may be mentioned cellulose-based polymers such as carboxymethyl cellulose, methyl cellulose and hydroxypropyl cellulose and ammonium salts thereof as well as alkali metal salts thereof; (degenerated) poly(meth)acrylic acid and ammonium salts thereof as well as alkali metal salts thereof; polyvinyl alcohols such as (degenerated) polyvinyl alcohol, a copolymer of acrylic acid or acrylic acid salts with vinyl alcohol, and a copolymer of anhydrous maleic acid or maleic acid, or fumaric acid with vinyl alcohol; polyethylene glycol, polyethylene oxide, polyvinylpyrrolidone, degenerated polyacrylic acid, oxidized starch, phosphoric acid starch, casein, a variety of degenerated starch, etc. Amount of the thickener is preferably 0.5 to 1.5 parts by mass per 100 parts by mass of the active material. When the amount of the thickener is within the range, coating property and adhesiveness with the collector are favorable. In the present embodiments, "(degenerated) poly" means "undegenerated poly" or "degenerated poly", and "(meth) acrylic" means "acrylic" or "methacrylic".

(Electrical Conducting Material)

The electrode slurry of the present embodiments may include an electrical conducting material. As the electrical conducting material, conductive carbon such as acetylene black, ketjen black, carbon black, graphite, vapor-grown carbon fiber and carbon nanotube can be used. By using the electrical conducting material, electrical interengagement between electrode active materials can be improved, and discharge rate property can be improved when used for a nonaqueous electrolyte secondary battery. Amount of the electrical conducting material is normally 0 to 20 parts by mass, preferably 1 to 10 parts by mass, per 100 parts by mass of the active material.

(Production of Slurry Composition for Nonaqueous Electrolyte Secondary Battery Electrode)

The slurry composition for a nonaqueous electrolyte secondary battery electrode can be obtained by mixing the above binder composition for a nonaqueous electrolyte secondary battery electrode, the active material, and if necessary, the thickener and electrical conducting material.

A method for mixing is not particularly limited, and for example, there may be mentioned a method with the use of a mixing apparatus such as an agitating-type, shaking-type and rotating-type. Also, there is a method with the use of a dispersion mixer such as a homogenizer, ball mill, sand mill, roll mill and planetary kneading machine.

(Electrode)

The electrode of the present embodiments is an electrode comprising an active material layer, obtained by coating and drying the electrode slurry of the present embodiments, and a collector. A production method of the electrode of the present embodiments is not particularly limited, and for example, there may be mentioned a method in which the active material layer is formed by coating said electrode slurry on at least one side, preferably both sides, of the collector, followed by heating and drying. A method for coating the electrode slurry onto the collector is not particularly limited. For example, there may be mentioned methods such as a doctor blade method, dip method, reverse roll method, direct rolling method, gravure method, extrusion method and brush painting. A method for drying may include, for example, drying method with warm air, hot air or cool wet air, vacuum drying, a drying method with irradiating (far) infrared rays or electron beam, etc. Drying time is normally 5 to 30 minutes, and drying temperature is normally 40 to 180° C.

Then, it is preferable to reduce the porosity of the active material layer by pressure treatment using mold press or roll press. The preferable range of the porosity is 5% to 15%, more preferably 7% to 13%. Too high porosity may cause deterioration in charge efficiency and discharge efficiency. Too low porosity may cause problems such that it is difficult to obtain high volume and capacity, and that the active material layer is easily peeled from the collector to cause defects.

When using a curable polymer, it is preferable to cure.

Thickness of the active material layer of the electrode of the present embodiments is normally 5 µm or more to 300 µm or less, preferably 30 µm or more to 250 µm or less.

(Collector)

The collector used in the present invention may not be particularly limited if it has electrical conductivity and electrochemical resistance, and metallic material, for example, including iron, copper, aluminum, nickel, stainless steel, titanium, tantalum, gold and platinum, is preferable because it has heat resistance. Among these, aluminum is particularly preferable for the positive electrode of the nonaqueous electrolyte secondary battery and copper is particularly preferable for the negative electrode. Shape of the collector is not particularly limited, and a sheet-shaped collector with a thickness of about 0.001 to 0.5 mm is preferable. The collector is preferably used after preliminary surface roughening for increasing adhesion strength with the active material layer. For the surface roughening method, a mechanical method of polishing, electropolishing, chemical polishing, etc. may be mentioned. In the mechanical method of polishing, a coated abrasive with adhering abrasive particles, grinding stone, emery buff, wire-brush provided with steel wire, etc. can be used. Also, for increasing the adhesion strength and conductivity of the active material layer, a surface of the collector may be formed with an intermediate layer.

(Nonaqueous Electrolyte Secondary Battery)

The nonaqueous electrolyte secondary battery of the present embodiments is a nonaqueous electrolyte secondary battery in which the electrode of the present embodiments is provided as at least one electrode of the positive electrode and negative electrode. The effects of the present invention can be used for either positive electrode or negative electrode.

(Electrolytic Solution)

The electrolytic solution used in the present embodiments is not particularly limited, and for example, may be the one in which lithium salt is dissolved in a nonaqueous solvent as a supporting electrolyte. As the lithium salt, for example, there may be mentioned $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SO_2)_2NLi$, etc. In particular, it is preferable to use $LiPF_6$, $LiClO_4$ and $CF_3SO_3Li$, easily soluble in a solvent and showing a high degree of dissociation. These can be used alone or in a mixture of 2 or more. Amount of the supporting electrolyte is normally 1 mass % or more, preferably 5 mass % or more, and normally 30 mass % or less, preferably 20 mass % or less, to the electrolytic solution. Either too large or too small amount of the supporting electrolyte may result in reducing ion conductivity and deteriorating charging and discharging properties of the battery.

As the solvent used for the electrolytic solution, any solvent in which the supporting electrolyte can be dissolved can be used without particular limitation, and normally, alkyl carbonates such as dimethyl carbonate (DMC), ethylene carbonate (EC), diethyl carbonate (DEC), propylene carbonate (PC), butylene carbonate (BC) and methyl ethyl carbonate (MEC); esters such as γ-butyrolactone and methyl formate, and ethers such as 1,2-dimethoxyethane and tetrahydrofuran; sulfur-containing compounds such as sulfolane and dimethylsulfoxide; can be used. Particularly, dimethyl carbonate, ethylene carbonate, propylene carbonate, diethyl carbonate and methyl ethyl carbonate are preferable because they are easy to obtain high ion conductivity and have broad operating temperature limit. These can be used alone or in a mixture of 2 or more.

Also, said electrolytic solution can be used with an additive therein. As the additive, carbonate-based compounds such as vinylene carbonate (VC) are preferable.

As an electrolytic solution other than those above, there may be mentioned a gel polymer electrolyte obtained by impregnating a polymer electrolyte such as polyethylene oxide and polyacrylonitrile with an electrolytic solution, and an inorganic solid electrolyte such as LiI and $Li_3N$.

(Separator)

As a separator, any known separator can be used, including polyolefin pore membrane or nonwoven fabric such as polyethylene and polypropylene; porous resin coat containing inorganic ceramic powder; etc.

(Production Method of Battery)

The production method of the nonaqueous electrolyte secondary battery of the present embodiments is not particularly limited. For example, a negative electrode and a positive electrode are stacked together via a separator, and placed in a battery case by winding and folding, etc., depending on the battery shape, followed by inserting an electrolytic solution into the battery case and sealing the case. Also if necessary, an expanded metal, an overcurrent protection device such as fuse and PTC element, a lead plate, etc. may be placed as well, for preventing increase in internal pressure of the battery, and overcharge-discharge. Shape of the battery may be any one of coin-type, button-type, sheet-type, cylinder-type, horn-shape and flat-type.

EXAMPLES

Hereinafter, the present invention will be explained based on examples, but the present invention is not limited to the examples. Note that in the present examples "part" and % are mass standard unless otherwise provided.

In the examples and comparative examples, a variety of properties were evaluated as below.

(Average Disperse Particle Diameter of Antioxidizing Agent)

For the emulsified antioxidizing agent, an average disperse particle diameter was measured with Laser Diffraction Particle Size Analyzer LS230 (made by Beckman Coulter).

(Change Rate of Slurry Viscosity)

A slurry viscosity change rate was obtained from slurry viscosity after 1 hour from producing the electrode slurry and slurry viscosity after 5 hours, and evaluated based on the following criteria.

slurry viscosity change rate (%) 100×{(viscosity after 5 hrs)−(viscosity after 1 hr)}/(viscosity after 1 hr)

A: less than 10%
B: 10% or more to less than 20%
C: 20% or more to less than 30%
D: 30% or more Note that the slurry viscosity was measured with a rotational single-cylinder viscosimeter in accordance with JIS Z8803:1991 (25° C., number of rotation=60 rpm, spindle shape: 4).

(Coating Thickness of Electrode)

The above electrode slurry was coated on both sides of copper foil with a thickness of 18 μm by using a comma coater to have a thickness of dried membrane of 100 μm or so, and dried at 60° C. for 20 minutes, followed by heating treatment at 150° C. for 2 hours to obtain an original fabric of electrode. This original fabric of electrode was extended by applying pressure with roll press to obtain an electrode for a negative electrode with a thickness of 170 μm. Note that coating thickness of the obtained electrode was measured by using a thickness indicator (Thickness meter B-1; Toyo Seiki Seisaku-sho, Ltd.), and evaluated for uniformity of the coating thickness.

(Charge-Discharge Properties)

(1) Initial Charge-Discharge Properties

By using the obtained coin-type battery, charge-discharge process, in which the battery was charged to 1.5V and discharged to 0.2V by constant current method respectively at 25° C. with charge-discharge rate of 0.1 C, was repeated 5 times, and battery capacity was measured each time. Initial charge-discharge efficiency, defined as a ratio expressed in percentage of the first discharge capacity to the first charge capacity, was evaluated based on the following criteria. The larger value indicates that the battery has smaller primary capacity deterioration.

A: 95% or more
B: 90% or more to less than 95%
C: 85% or more to less than 90%
D: less than 85%

(2) Charge-Discharge Cycle Characteristic

By using the obtained coin-type battery, charge-discharge process, in which the battery was charged to 1.5V at constant current of 0.1 C and discharged to 0.2V at constant current of 0.1 C respectively at 20° C., was repeated. The number of the charge-discharge cycles was 50, and capacity maintenance ratio, defined as a ratio of discharge capacity at 50th cycle to the primary discharge capacity, was evaluated based on the following criteria. The larger value indicates small reduction in capacity due to repeated charge-discharge.

A: 60% or more
B: 50% or more to less than 60%
C: 40% or more to less than 50%
D: less than 40%

(3) Charge-Discharge Rate Property (Load Characteristics)

Except for changing the constant current in measurement conditions to 1.0 C, discharge capacity at each constant current was measured as with measurements in charge-discharge cycle characteristic. Charge-discharge rate property, calculated in percentage as a ratio of the discharge capacity under the present conditions to the above battery capacity, was evaluated based on the following criteria. The larger value indicates small internal resistance to allow high-speed charge-discharge.

A: 95% or more
B: 90% or more to less than 95%
C: 85% or more to less than 90%
D: less than 85%

(4) Variability of Cycle Characteristics

The charge-discharge cycle test shown in the above (2) was done for plural samples (n=10) to check variability in the capacity maintenance ratios. Level of the variability, defined as the difference between the maximum and minimum capacity maintenance ratios of each battery, was evaluated based on the following criteria. The smaller value indicates that the battery can stably be provided.

A: less than 5%
B: 5% or more to less than 10%
C: 10% or more to less than 15%
D: 15% or more Example 1

(Emulsification of Antioxidizing Agent)

40 parts of water, 4 parts of surfactant (product name: Emal 2F, made by Kao Corporation) and 2 parts of ethanol were mixed and heated to 60° C. While the obtained solution was agitated with Homo Disper, 50 parts of a polymeric phenol compound (with weight average molecular weight of 600 to 700, specific gravity of 1.1, and melting point of 100° C.) expressed in the following formula was fallen in drops into the solution as an antioxidizing agent. After 30 minutes from the drop, the solution was continuously agitated, and emulsion of the antioxidizing agent was obtained. The average disperse particle diameter of the antioxidizing agent in the emulsion was 0.8 μm.

[Chemical formula 2]

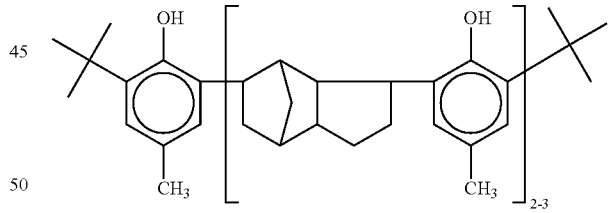

(Production of Binder Composition)

47 parts of styrene, 49 parts of 1,3-butadiene, 3 parts of methacrylic acid, 1 part of acrylic acid, 5 parts of sodium dodecylbenzene sulfonic acid, 150 parts of ion-exchange water and 1 part of potassium persulfate as a polymerization initiator were placed in a 5-MPa pressure resistant autoclave with a mixer, and thoroughly agitated, followed by heating to 45° C. to start polymerization. When consumed amount of the monomers became 96.0%, the mixture was cooled to terminate the reaction, so that aqueous dispersion of diene-based polymer particles (aqueous dispersion of SB-based particles) with solid content concentration of 42% was obtained.

The emulsified antioxidizing agent was added such that its concentration was 0.5 part per 100 parts of the polymer in the aqueous dispersion of the diene-based polymer particles, and agitated for about 24 hours by using Homo Disper to obtain a binder composition.

(Production of Electrode Slurry)

As a carboxymethyl cellulose, carboxymethyl cellulose having solution viscosity of 8000 mPa·s ("Celogen BSH-12" made by Daiichi Kogyo Seiyaku Co. Ltd.) was used to prepare 1% aqueous solution.

100 parts of synthetic graphite with an average particle diameter of 24.5 μm was placed as an active material in a planetary mixer with disper, 100 parts of the above aqueous solution was added thereto, and its solid content concentration was adjusted to 53.5% with ion-exchange water, followed by mixing at 25° C. for 60 minutes. Then, the solid content concentration was adjusted to 44% with ion-exchange water, followed by further mixing at 25° C. for 15 minutes. Next, 2.9 parts of the above binder composition (based on the solid content) was added, and further mixed for 10 minutes. This was subject to defoaming treatment under reduced pressure to obtain shiny and fluent electrode slurry.

Table 1 shows an evaluation result of viscosity change rate of the electrode slurry after 5 hours.

(Production of Battery)

The above electrode slurry was coated on both sides of copper foil with a thickness of 18 μm by using a comma coater to have a thickness of dried layer[1] of 100 μm or so, and dried at 60° C. for 20 minutes, followed by heating treatment at 150° C. for 2 hours to obtain an original fabric of electrode. This original fabric of electrode was extended by applying pressure with roll press to obtain an electrode for a negative electrode with a thickness of 170 μm. As a result of measuring coating thickness of the obtained electrode, the thickness of the electrode was almost uniform.

Said electrode for a negative electrode was cut into a discoid sample with a diameter of 15 mm; a separator comprising a discoid porous polypropylene membrane with a diameter of 18 mm and a thickness of 25 μm, metallic lithium used as a positive electrode and expanded metal were alternately stacked on the active material layer side of this negative electrode; and this was housed in a coin-type stainless steel outer packaging case (with a diameter of 20 mm, a height of 1.8 mm and a stainless steel thickness of 0.25 mm) in which polypropylene packing was placed. The electrolyte solution was inserted in this case without leaving air; a stainless steel cap with a thickness of 0.2 mm was put on the outer packaging case via the polypropylene packing tightly; and the battery can was sealed to prepare a lithium ion coin battery with a diameter of 20 mm and a thickness of about 2 mm.

Note that a solution, obtained by dissolving $LiPF_6$ in a concentration of 1 mol/L in a mixed solvent obtained by mixing ethylene carbonate (EC) and diethyl carbonate (DEC) in a ratio of EC:DEC=1:2 (volume ratio at 20° C.), was used as the electrolyte solution.

Table 1 shows an evaluation result of the battery performance.

Example 2

Except for adding the emulsified antioxidizing agent to the aqueous dispersion of the diene-based polymer particles such that its concentration was 0.05 part per 100 parts of the polymer in the aqueous dispersion of the diene-based polymer particle, the same procedures were done as in Example 1. As a result of measuring coating thickness of the obtained electrode, the thickness of the electrode was almost uniform. The results are shown in Table 1.

Example 3

Except for adding the emulsified antioxidizing agent to the aqueous dispersion of the diene-based polymer particles such that its concentration was 5 parts per 100 parts of the polymer in the aqueous dispersion of the diene-based polymer particle, the same procedures were done as in Example 1. As a result of measuring coating thickness of the obtained electrode, the thickness of the electrode was almost uniform. The results are shown in Table 1

Comparative Example 1

Except for using an unemulsified antioxidizing agent in a powdery state instead of the emulsified antioxidizing agent, the same procedures were done as in Example 1. As a result of measuring coating thickness of the obtained electrode, variability was found in the thickness of the electrode. The evaluation results are shown in Table 1.

Comparative Examples 2

Except for using polyvinylidene fluoride (PVDF) dissolved in N-methylpyrrolidone as the binder, and using an unemulsified antioxidizing agent in a powdery state instead of the emulsified antioxidizing agent, the same procedures were done as in Example 1 to obtain a binder composition. 100 parts of synthetic graphite with an average particle diameter of 24.5 μm was placed as an active material in a planetary mixer with disper, 10 parts of the above binder composition (based on the solid content) was added thereto and N-methylpyrrolidone was further added thereto. This was subject to defoaming treatment under reduced pressure to obtain shiny and fluent electrode slurry. Subsequent procedures were same as in Example 1. As a result of measuring coating thickness of the obtained electrode, variability was found in the thickness of the electrode. The evaluation results are shown in Table 1.

TABLE 1

|  | Macromolecular species | change rate of slurry viscosity | Primary Charge-Discharge Properties | Rate Property | Cycle Characteristic | Variability of Cycle Characteristics |
|---|---|---|---|---|---|---|
| Example 1 | SB-based fluid dispersion of polymer particle | A | B | B | A | A |
| Example 2 | SB-based fluid dispersion of polymer particle | C | B | C | B | C |
| Example 3 | SB-based fluid dispersion of polymer particle | C | B | C | C | C |
| Comparative Example 1 | SB-based fluid dispersion of polymer particle | D | C | C | D | D |
| Comparative Example 2 | PVDF | D | B | B | B | D |

The invention claimed is:

1. A slurry composition for a nonaqueous electrolyte secondary battery electrode comprising:
   a binder composition for a secondary battery electrode comprising a binder and an emulsified antioxidizing agent; and
   an active material.

2. The slurry composition for a nonaqueous electrolyte secondary battery electrode as set forth in claim 1, wherein the binder is an aqueous binder including a diene-based polymer.

3. The slurry composition for a nonaqueous electrolyte secondary battery electrode as set forth in claim 1 or 2, wherein the antioxidizing agent is a polymeric phenolic compound.

4. An electrode for a nonaqueous electrolyte secondary battery, wherein an electrode layer, obtained by coating the slurry composition for a secondary battery electrode as set forth in claim 1 on a collector and drying, is bound to the electrode.

5. A nonaqueous electrolyte secondary battery comprising the electrode as set forth in claim 4.

6. A production method of a slurry composition for a nonaqueous electrolyte secondary battery electrode comprising:
   preparing a binder composition for a nonaqueous electrolyte secondary battery electrode by mixing a binder and an emulsified antioxidizing agent; and
   mixing said binder composition with an active material.

* * * * *